United States Patent [19]

Carlsson et al.

[11] Patent Number: 4,859,887
[45] Date of Patent: Aug. 22, 1989

[54] SYNCHRONOUS MACHINE

[75] Inventors: Tage Carlsson; Jan Sandberg, both of Västerås, Sweden

[73] Assignee: ASEA Aktiebolag, Västerås, Sweden

[21] Appl. No.: 82,920

[22] Filed: Aug. 6, 1987

Related U.S. Application Data

[63] Continuation of Ser. No. 783,725, Oct. 3, 1985.

[30] Foreign Application Priority Data

Oct. 5, 1984 [SE] Sweden ............................. 8404989

[51] Int. Cl.⁴ ............................................. H02K 9/00
[52] U.S. Cl. ........................................ 310/59; 310/55; 310/60 A; 310/61; 310/157; 277/12
[58] Field of Search ........................ 310/52, 53, 55, 58, 310/59, 60 R, 60 A, 61, 62, 63, 64, 65, 157, 269, 254, 258, 259, 261, 264, 265, 163, 164, 162, 165; 277/12; 384/130

[56] References Cited

U.S. PATENT DOCUMENTS

| | | |
|---|---|---|
| 1,543,537 | 6/1925 | Wilkinson . |
| 3,517,232 | 6/1970 | Sano ........................ 310/59 |
| 3,529,193 | 9/1970 | Lindstedt .................. 310/264 |
| 4,061,937 | 12/1977 | Goel ........................ 310/65 |
| 4,383,191 | 5/1983 | Mizuyama .................. 310/269 |
| 4,467,229 | 8/1984 | Ogita ...................... 310/269 |
| 4,508,985 | 4/1985 | Paulik ..................... 310/55 |

FOREIGN PATENT DOCUMENTS

| | | |
|---|---|---|
| 729504 | 12/1942 | Fed. Rep. of Germany . |
| 1195402 | 6/1965 | Fed. Rep. of Germany . |
| 2401588 | 1/1974 | Fed. Rep. of Germany ...... 310/269 |
| 3015435 | 4/1980 | Fed. Rep. of Germany . |
| 0222054 | 12/1984 | Japan ...................... 310/269 |
| 340895 | 10/1959 | Switzerland . |

OTHER PUBLICATIONS

"Theory of Servomechanisms"; H. M. James et al.; McGraw-Hill Book Co; New York, Toronto, London; 1947.
"Textbook of Servomechanisms"; J. C. West; English Univ. Press. Ltd.; London; 1955.
"1979 Mechanical Drives Reference Issue" pp. 178–249; Penton/IPC Publication; Jun. 28, 1979.

Primary Examiner—R. Skudy
Attorney, Agent, or Firm—Pollock, Vande Sande & Priddy

[57] ABSTRACT

A synchronous machine having a rotor with a plurality of salient poles which are supported by a rotor rim. The rotor rim is arranged by means of a hollow annular device in mechanical connection with a rotor hub, cooling gas flowing into the annular device relatively close to the hub and leaving at the rotor rim, flowing through cooling ducts in the rotor and stator, through a cooler and out into a cooling gas space which includes a plurality of guide vanes arranged so that the cooling gas on its way from the cooler to the hollow, annular device passes through the guide vanes and is thus put in rotation around the axis of rotation of the rotor.

5 Claims, 6 Drawing Sheets

SYNCHRONOUS MACHINE

This application is a continuation of application Ser. No. 783,725 now abandoned filed Oct. 3, 1985.

FIELD OF THE INVENTION

The present invention relates to a synchronous machine comprising a stator with an annular stator core, the stator surrounding a rotor with a rotor shaft, a rotor hub, a rotor rim, a plurality of salient poles supported by the rotor rim and a plurality of arm plates arranged at a mutual angular distance between the rotor rim and the rotor hub, at least one cooler for cooling gas, two annular end plates arranged transversely in relation to the rotor shaft and in the space between the rotor rim and the rotor hub, at least one of the end plates being arranged to constitute a torque-transmitting connection between the rotor rim and the rotor hub, the end plates being attached to the arm plates, the maching comprising a gas space which is defined by a cylindrical wall arranged substantially coaxially with the generator, a cover plate arranged axially outside the rotor, means for sealing between the rotor shaft and the cover plate, and by at least one of these end plates, the stator core as well as the rotor rim being provided with a plurality of passageways for a radially outwardly flowing cooling gas, the cooler being arranged to receive a flow of cooling gas delivered from the passageways traversing the stator core and to deliver the flow to the gas space, the rotor passageways being arranged to be supplied with cooling gas via a plurality of inlet chambers defined by these end plates and the arm plates, inlet openings for the supply of cooling gas from the cooling gas space to inlet chambers which are formed radially spaced from the rotor rim by arranging at least one of the end plates to provide incomplete sealing of each one of the inlet chambers in the axial direction, at least one of the end surfaces of the rotor rim being tightly shielded from the gas space by means of an annular non-rotating shield arranged coaxially with the rotor.

DESCRIPTION OF THE PRIOR ART

A machine according to the above is known, for example, from U.S. Pat. No. 3,529,193.

In known machines of the above defined type, the centrifugal forces provide such a great pressure increase, in a radially outward direction, of the cooling gas flowing in through the above-mentioned inlet openings that a throttle means usually has to be introduced in the cooling gas circuit to prevent the flow of cooling gas from becoming unnecessarily large, which would involve unnecessarily large ventilation losses in the machine. The throttling is usually achieved by imposing restrictions for dimensioning the inlet and/or outlet openings of the inlet chambers. The object of the present invention is to provide within the machine—a device which limits the flow of cooling gas to avoid turbulence and other heat-generating phenomena in the circulating cooling gas to the extent possible, by utilizing in connection with this device—the components which are part of the conventional construction.

SUMMARY OF THE INVENTION

According to the invention, the necessary limitation of the cooling gas flow is accomplished by imparting to the flow—before it is supplied to the inlet chamber—a considerable tangential velocity component by deflecting it with the aid of a plurality of guide vanes. The vanes are arranged tangentially one after the other in an annular portion of the cooling gas space, this portion being coaxial with the rotor.

Together with shielding devices which force the flow of cooling gas to flow along the guide vanes without deviating to the sides to any significant extent, the guide vanes constitute a limiting device for the cooling gas flowing through the machine. The deflection is performed with no significant reduction of the energy contents of the cooling gas flow. By passing through the guide vanes the flow of cooling gas is put into rotation about the axis of rotation of the machine in the direction of rotation of the rotor. The corresponding rotation energy inherent in the cooling gas flow is not transformed into heat to any significant extent during the transport of the rotor cooling gas to the cooling channels but is retained as rotation energy in the cooling gas flowing through the rotor inlet chambers of the rotor and the rotor cooling channels. Contrary to conventional machines, no power—or only a relatively small amount of power—is needed to give the cooling gas flowing through the above-mentioned inlet openings the same speed of rotation as the rotor.

By use of the invention a considerable increase in the efficiency of the machine is achieved.

According to a further embodiment of the invention, the guide vanes are arranged to alow for rotation of each one about a turning axis. All the turning axes lie in a surface of revolution arising by rotation of one turning axes about the axis of rotation of the machine, and the ability to turn means that the deflection and—therefore—the magnitude of the cooling gas flow can be adjusted. The guide vanes are suitably arranged to be turnable by one or several servo motors connected to temperature measuring means and to a reference value generator so that the machine temperature is maintained constant at varying machine loads and at varying temperatures of the cooling water which is supplied to the primary side of the heat exchanger. The constant temperature is then chosen approximately equal to the maximum temperature that can be permitted during continuous operation without any noticeable reduction of the life of the machine.

BRIEF DESCRIPTION OF THE DRAWINGS

In the following the invention will be described with reference to the accompanying schematic drawings, wherein FIGS. 1 and 2 show a first embodiment of a machine according to the present invention, of which FIG. 1 shows an axial section through one half of the machine along I—I of FIG. 2. FIG. 2 shows one-fourth of the same machine in a radial section along II—II of FIG. 1;

FIGS. 3 and 4 show a second embodiment of a machine according to the invention, of which FIG. 3 shows an axial section through one half of the machine along III—III of FIG. 4. FIG. 4 shows one-fourth of the same machine in a radial section along IV—IV of FIG. 3;

DESCRIPTION OF THE PREFERRED EMBODIMENTS

Figure 1:
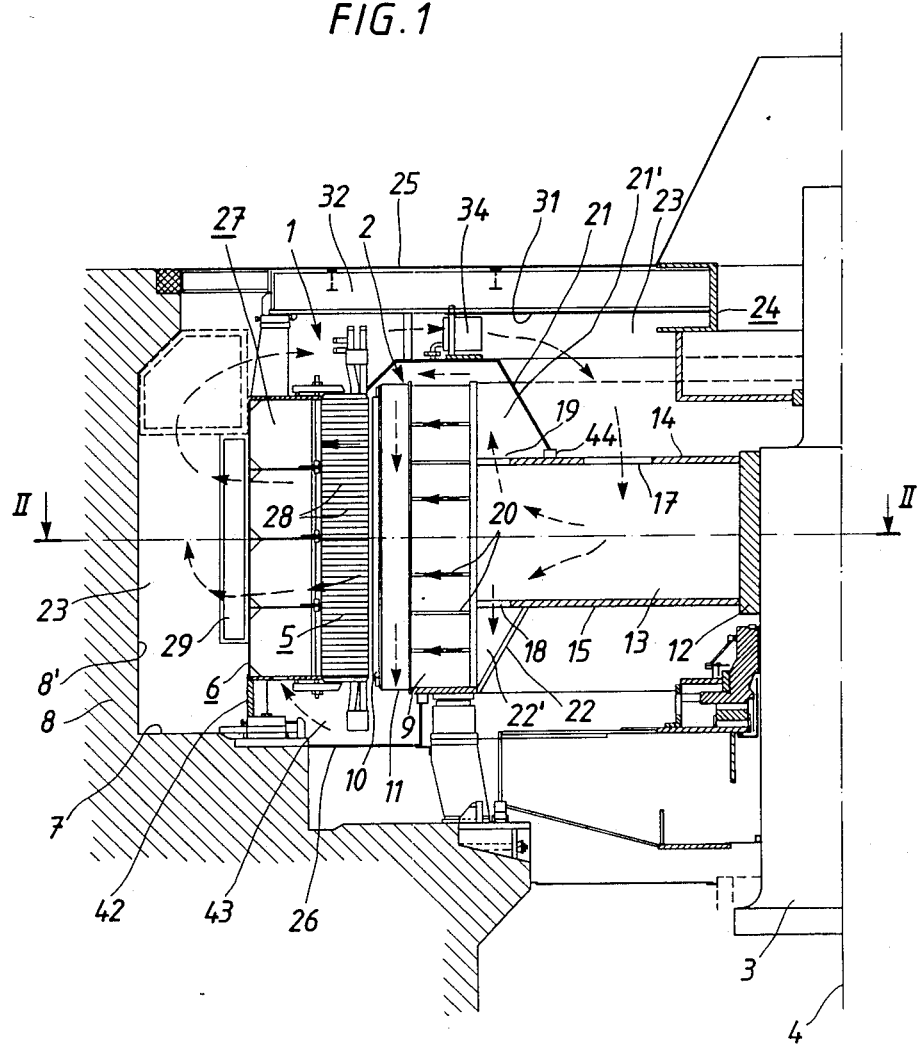
Figure 2:
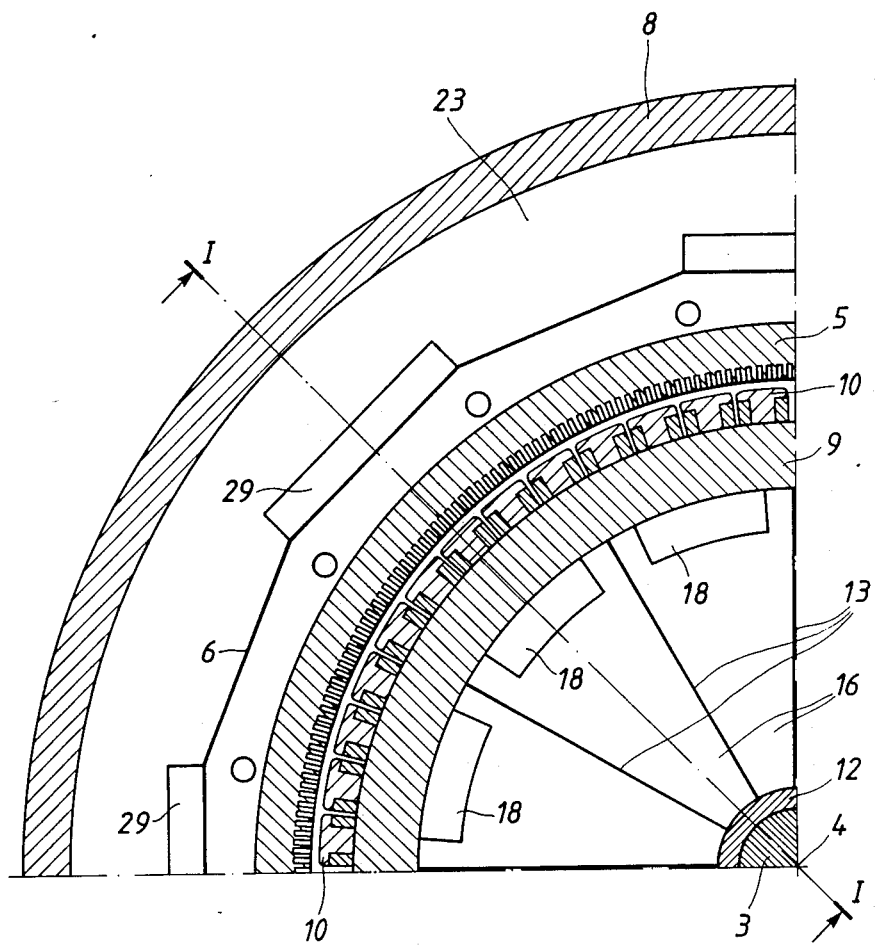

In FIGS. 1 and 2, 1 designates the stator, 2 the rotor and 3 the rotor shaft of a synchronous generator having a vertical axis of rotation 4. The stator core 5 is attached to a stator frame 6 surrounding the stator core and mounted on a horizontal limiting surface 7 of a generator pit made of concrete. The generator pit is limited in a radial direction by a concrete wall 8, the inner limiting surface 8' which consists substantially of a cylindrical surface coaxial with the rotor and the stator. The rotor 2 has a hollow-cylindrical rotor rim 9 which is made of a magnetic material and which supports a plurality of salient poles 10, which are each provided with a rotor coil 11. The rotor rim 9 is arranged in mechanical connection with a rotor hub 12, fixed to the shaft 3, by means of a plurality of arm plates 13, each of which are preferably arranged in an individual axial plane with constant mutual angular distances. An upper end plate 14 and a lower end plates 15 are arranged transversely to the axis of rotation 4—preferably in one radial plane each—and welded to the upper and lower edges, respectively, of all the arm plates, whereby the torque transmission between the rotor hub 12 and the rotor rim 9 for the major part takes place with the aid of the lower end plate 15. Rotor rim 9, hub 12, upper end plate 14 and lower end plate 15 define a plurality of annularly sector-shaped spaces which constitute inlet chambers 16 for a cooling gas, for example air. Each inlet chamber 16 has a circular inlet opening 17 provided in the upper end plate 14 and an outlet opening 18 for cooling gas provided in the lower end plate 15 and arranged in the vicinity of the rotor rim, as well as an outlet opening 19 provided in the upper end plate 14 which is formed and arranged in the same way as the outlet opening 18. Each one of the end plates 14 and 15 may be composed of a plurality of separately manufactured elements. The rotor rim 9 has a plurality of radially extending ducts 20 for cooling gas. During normal machine operation, centrifugal forces result in cooling gas being sucked via the inlet openings 17 into the inlet chambers 16, from which the cooling gas flowing directly through a plurality of radial rotor rim ducts located at the mid-portion of the rotor, a plurality of radial rim ducts located at the upper rotor end which are arranged to be supplied with cooling gas via the outlet openings 19 and a plurality of radial rotor rim ducts located at the lower rotor end which are arranged to be supplied with cooling gas via the outlet openings 18. The outlet openings 19 open out into an annular upper distribution chamber 21', which is defined between the rotor rim and a stationary, annular double-curved shield 21. First shield 21 has two circular edges, one of which is sealingly attached to the upper end surface of the stator core 5, the other being provided with a stationary, brush-shaped sealing ring 44 which makes contact with an annular sealing portion of the end plate 14. The outlet openings 18 open out into a lower distribution chamber 22' which is defined by means of an annular, conical shield 22, the lower edge of which is fixed in a sealing mechanical connection with the lower end portion of the rotor rim, the upper edge being fixed to the lower end plate 15 in a sealing connection therewith.

Stator 1 and rotor 2 are enclosed within a gas space 23 in which cooling gas is circulating. The gas space 23 is defined, by part of the upper side of the end plate 14, part of the shaft 3, a stationary cylindrical shield means 24 sealing against the shaft and arranged coaxially therewith, this shield means 24 making sealing contact with the inner periphery of an annular cover plate 25 for the generator pit, the concrete surfaces 8' and 7, an annular pneumatically sealing device 42 fixed coaxially in relation to the stator core between the lower end of the stator frame 6 and the concrete surface 7, and by end portions and radially outwardly facing surface portions of the outer limiting surface of the stator frame 6. A stationary shield ring 26 made with L-shaped cross-section defines—together with the sealing device 42—an annular collection space 43 for all the cooling gas flowing vertically downwards through the pole gaps.

Radially outside the outer cylindrical surface of the stator core and coaxially therewith, the stator frame 6 defines an annular chamber 27 of approximately the same axial dimension as the stator core. The stator 1 has a plurality of cooling ducts 28 extending radially through the stator core 5, these cooling ducts opening out into the annular chamber 27 which is arranged in a pneumatic connection with the inlet openings of a plurality of cooler ducts (not shown in the drawing) of at least one cooler 29. The cooler ducts open out into the gas space 23, preferably radially outside the stator frame 6. Preferably, a plurality of coolers 29 are used, which may be fixed to the stator frame as shown in FIGS. 1 and 2, or alternatively, be arranged outside the space 23. Each cooler 29 is formed as a heat exchanger, the cooler cuts being included in the secondary circuit, the primary circuit being traversed by a heat-absorbing medium, for example water.

Figure 5:
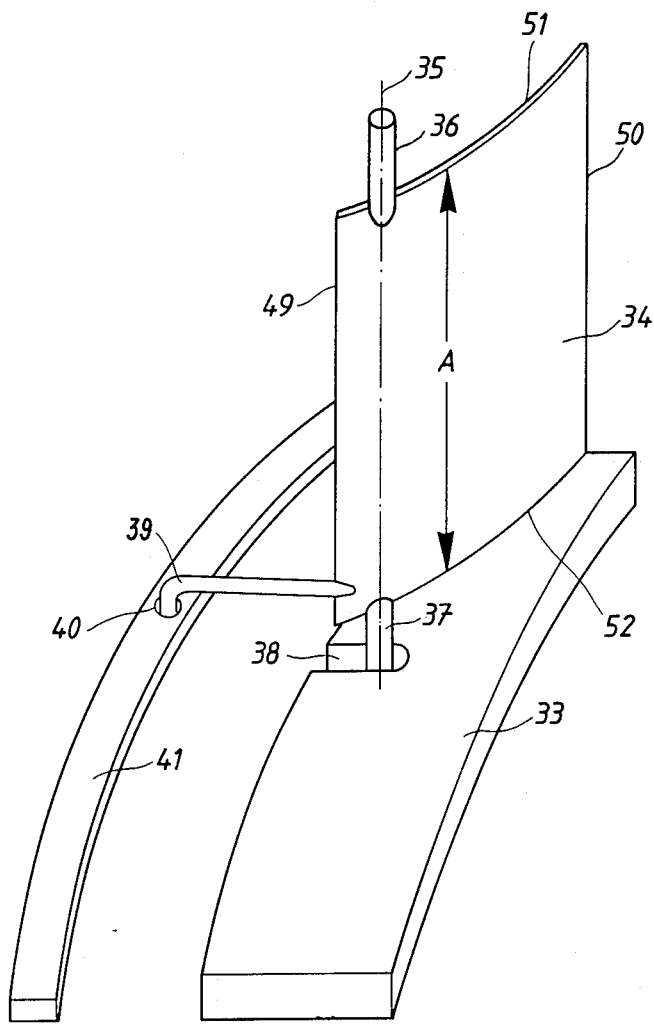
FIG. 5 shows on an enlarged scale a perspective view of embodiment shown in FIG. 1.

The flow paths of the cooling gas circulating in the machine are indicated in FIG. 1 by dash-lined arrows. It will be clear that part of the flow of cooling gas passing through the openings flows between the shield 21 and the upper end surface of the rotor rim and is thereafter—in the same way as the cooling gas flowing through the rotor ducts 20—supplied to the pole gaps of the rotor. Part of the cooling gas supplied to the pole gaps leaves the gaps via the downwardly facing openings of the pole gaps which open out into the collection space 43, and is then supplied to the annular chamber 27 via a plurality of inlet openings provided in the lower end surface of the rotor spider. The remaining part of the cooling gas flows from the pole gaps into the radial ducts 28 in the stator core 5 and from there into the annular chamber 27, from where the total cooling gas flows through the secondary circuit of the cooler 29 and out into a part of the gas space 23 which is located radially outside the stator frame 6. From there the cooled cooling gas flows radially inwardly on its way towards the inlet openings 17 of the rotor, whereby the entire flow of cooling gas passes through a part of the gas space 23 located above the stator and the rotor. A plane, annular circular guide shield 31, preferably arranged in a radial plane, is rigidly mechanically connected to the lower edges of a plurality of radially extending radial beams 32, which at their upper edges are rigidly mechanically connected to the annular cover plate 25. At its radially inner edge the guide shield 31 is arranged in a sealing mechanical connection with the shield means 24. The outer diameter of the guide shield 31 is approximately equal to the mean diameter of the rotor rim 9. Reference is also made to FIG. 5 in the following description. On its way towards the inlet openings 17 the entire flow of cooling gas passes through a space between the guide shield 31 and a plane portion of the double-curved shield 21 which is substantially arranged in a radial plane. In this space there are arranged a circular guide vane ring 33 and a plurality of guide vanes 34 supported by this ring, which are evenly and substantially tangentially distributed along the entire circumference of the guide vane ring and with the ability to rotate about a respective, substantially axially directed turning axis 35. The guide vane ring 33, which is coaxially arranged in relation to the rotor rim, makes contact with and is fixed to the plane portion of the shield 21. Each guide vane 34 has an inlet edge 49 and an outlet edge 50 which is substantially parallel to the inlet edge, as well as two side edges 51 and 52 extending transversely in relation to the edges 49 and 50. The average play between the side edge 51 and the guide shield 31, similarly to the average play between the side edge 52 and the guide vane ring 33, is chosen as small as possible and only to allow for the guide vane to be substantially freely turned about the turning axis 35. Each of the two plays constitutes at most 15%, preferably at most 5% of the maximum distance A between the two side edges. Each guide vane 34 has an upper pin 36 and a lower pin 37, which are coaxial with the turning axis 35, the lower pin being journalled in a corresponding recess 38 in the guide ring 33, the upper pin being journalled in one of the radial beams 32 and/or in the guide shield 31. Each guide vane 34 is provided with a radially directed operating arm 39 fixed to the guide vane. The free end of the arm 39 is formed with a vertical pin which is pivoted in a corresponding hole 40 of an operating ring 41. The operating ring 41 is coaxially arranged in relation to the rotor and is capable to turn about the axis of rotation 4.

Each guide vane consists of a body which in the horizontal direction is substantially limited by two single-curved, substantially parallel surfaces which are perpendicularly oriented with respect to a radial plane of the machine and curved in such a way that the total flow of cooling gas—in the gas space is practically radially directed. Passing through the guide vanes and with no significant reduction of the inherent energy the gas flow is deflected in the tangential direction, involving a change in direction of at least 10°, preferably more than 20°, and in such a way that the tangential velocity component has the same direction as the rotor. The total velocity of the air is increased upon its passage through the guide vanes and after passing the guide vanes. The energy for this velocity increase is taken from the static pressure. The static pressure of the air will then be lower when the air reaches the rotor than without guide vanes. Throttling of the air has been achieved resulting in a reduced air flow. The power that is required to give the amounts of cooling gas supplied to the rotor at the same speed of rotation as the rotors speed is reduced, since the air even before it reaches the rotor has a certain rate of rotation. The efficiency of the generator is increased, partly because of this power reduction, partly because a smaller amount of air is to be caused to rotate through the machine.

Alternatively, also the lower end plate 15 can be provided with inlet openings, in which case these are formed and arranged in the same way as the inlet openings 17 provided in the upper end plate, whereas the lower part of the machine is provided with guide vanes and a double-curved shield which as regards shape and location are substantially mirror-symmetrical about the line II—II with the corresponding guide vane 34 and shield 21 shown in FIG. 1, the vertical part of the shield 26 having been removed. The flow paths of the cooling gas in that half of the machine located below the line II—II will then have a course which can be illustrated by an arrow configuration which is mirror-symmetrical about the line II—II in relation to the corresponding arrow configuration shown above the line II—II in FIG. 1.

Figure 3:
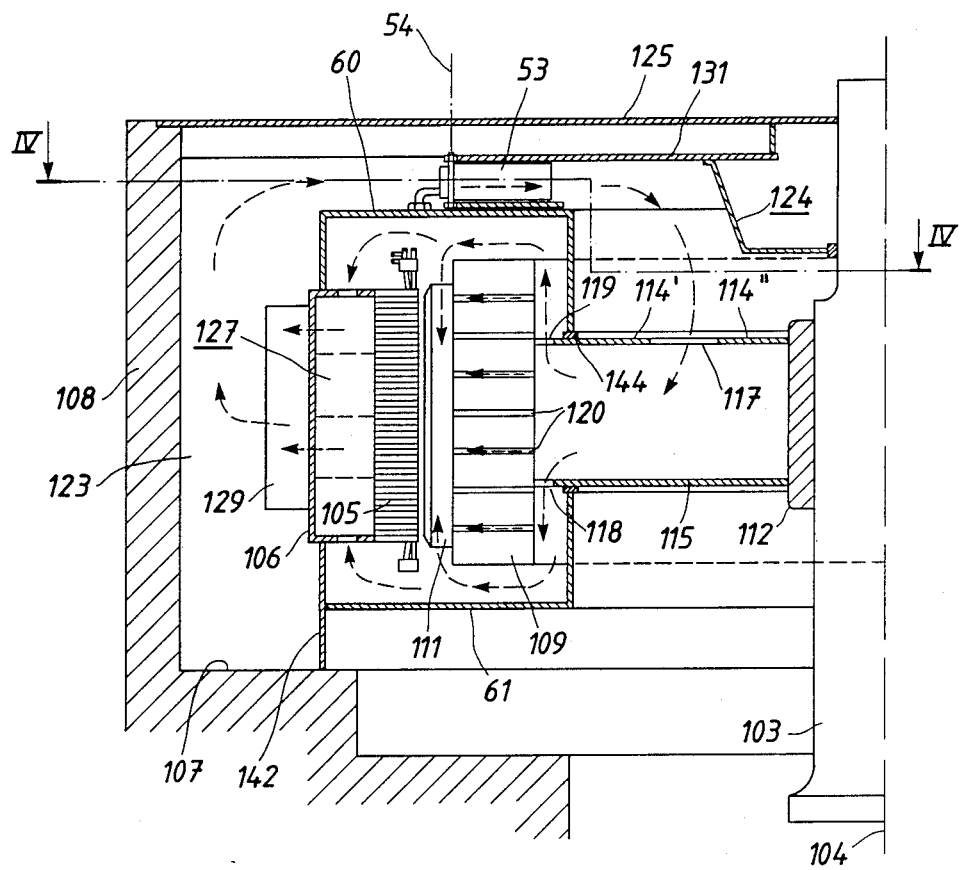
Figure 4:
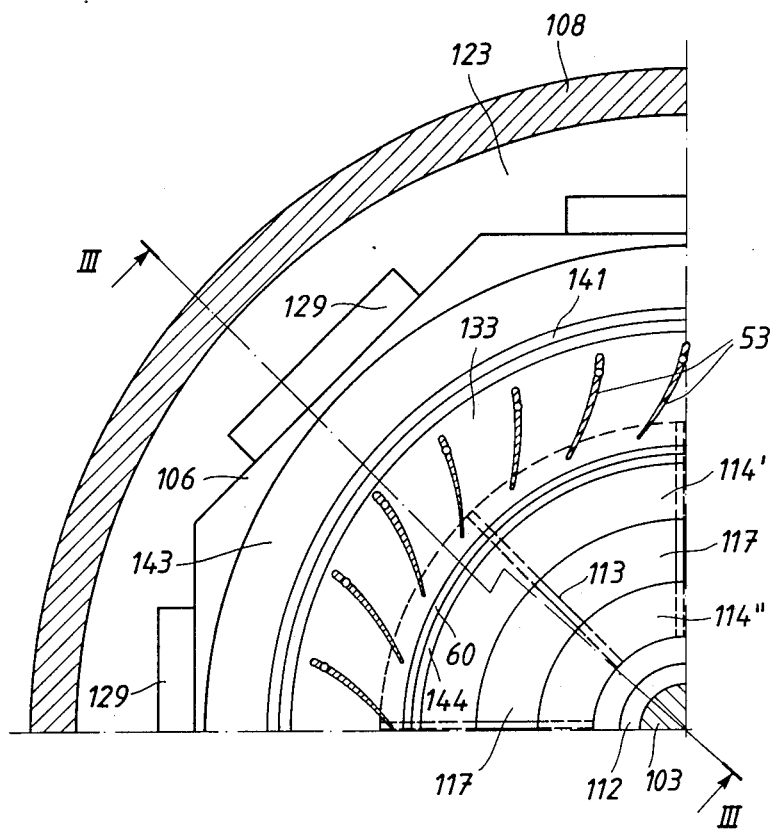

The machine shown in FIGS. 3 and 4 is different, in functional respect, from that shown in FIGS. 1 and 2 only in that an annular shield 60 is used instead of the double-curved first shield 21 and in that an annular shield 61 with L-shaped cross-section is used in the lower machine end instead of the 26. At its outer periphery the shields 60, 61 are arranged in a gastight mechanical connection with the stator frame. Each guide vane 53 is turnable about a corresponding turning axis 54. In addition, the machine shown in FIGS. 3 and 4 has—instead of the circular inlet openings 17 shown in FIG. 1—an equally large number of annularly sector-shaped inlet openings 117. These have been produced by using, instead of the annular end plate 14 shown in FIG. 1, two rings 114' and 114" arranged coaxially and in mutually spaced relation. The other structural members in FIG. 3 and/or FIG. 4 are provided with reference numerals which each exceeds the reference numeral of corresponding structural elements in FIG. 1 and/or FIG. 2 by one hundred.

The circulation paths of the cooling gas are indicated by dashlined arrows.

Figure 6:
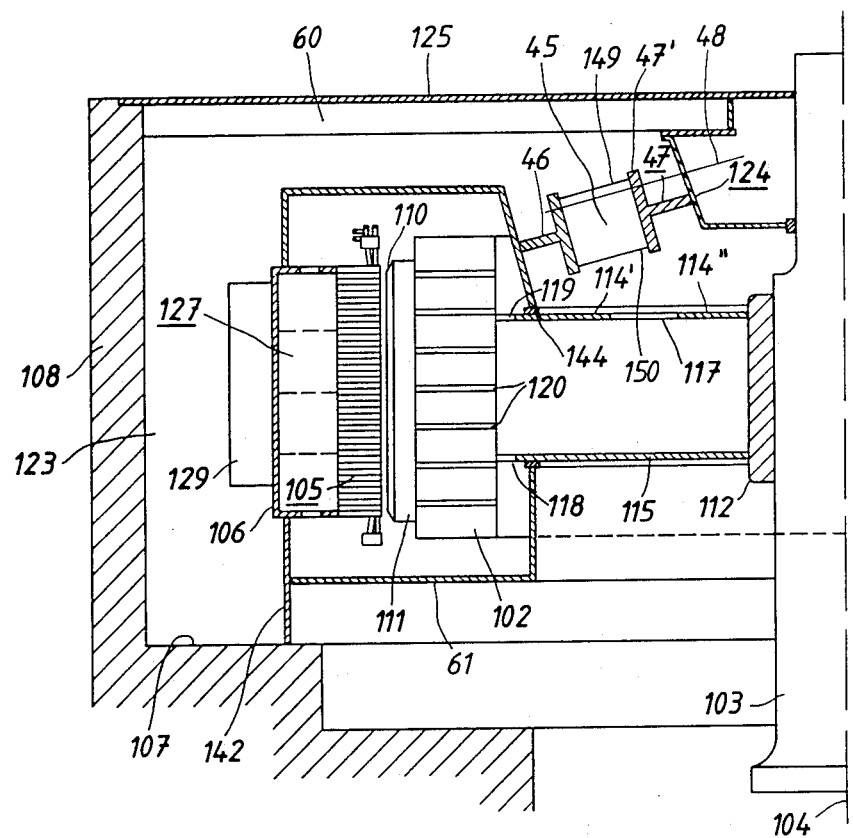
FIG. 6 shows in axial section a third embodiment of the present invention.

The machine shown in FIG. 6 differs from the machine shown in FIGS. 3 and 4 only as regards the arrangement of guide vanes. Structural elements with the same shape and location as the corresponding structural elements in FIGS. 3 and 4 have the same reference numerals. In the machine shown in FIG. 6—as well as within the embodiments described above—a plurality of guide vanes are evenly distributed one after the other in the tangential direction of an annular, above-mentioned space portion which is included in the above-mentioned cooling gas space. This annular space portion is in all cases coaxial with the rotor and it is deformed between a stationary shield, arranged above the rotor in mechanical connection with the stator, and a surface which outwardly defines the cooling gas space. In FIG. 6 a plurality of guide vanes 45 are arranged between two rings 46 and 47, respectively, of T-shaped cross-section which are arranged coaxially with the rotor and are fixed to the shield 60 and to the shield means 124, respectively. Nearest the guide vanes 45 the rings 46 and 47 are preferably formed as regular polygons, the number of polygon sides being equal to the number of guide vanes. Each guide vane 45 has substantially the same shape as the guide vane 34 shown in FIG. 5 and, is provided with two pins and arranged to turn about an axis 48, the position of which in relation to the guide vane is the same as the position of the turning axis 35 shown in FIG. 5. One of the two pins may be extended and passed out through the shield means 124 for connection to an operating member. Each of the guide vanes 45 has an inlet edge 149 and an outlet edge 150 as well as two side edges extending transversely in relation to the inlet and outlet edges. The ring 47 has a portion 47' which serves as a guide shield and is positioned close to a side edge of each of the guide vanes 45 with an average play of at most 15%, preferably at most 5% of the average distance between the side edges of the guide vane.

The guide vanes 45 impart a powerful rotation about the axis 48 to the cooling gas flowing between the rings 46 and 47, with the same direction of rotation as the rotor rotation.

The invention also comprises a plurality of types of synchronous machines in excess of those shown in the drawings. Thus, it also comprises synchronous machines with a horizontal axis of rotation and synchronous machines in which the cooling gas space is not defined outwardly by concrete walls but only by metallic casing walls.

As mentioned above, a cooler is considered to constitute part of a machine according to the invention also if it is located outside the cooling gas space, for example radially outside the concrete walls 8 and 108, respectively, or a corresponding metallic casing. In such cases, cooling gas is passed from the stator stand to the cooler and from the cooler to the cooling gas space by means of hydraulic connection conduits through radially or axially defined walls or cover plates.

We claim:

1. A synchronous machine comprising:
   a stator with an annular stator core, said stator core being provided with a plurality of passageways for admission of a radially outwardly flowing cooling gas;
   a rotor with a rotor shaft surrounded by said stator, and comprising a rotor hub, a rotor rim, a plurality of salient poles supported by said rotor rim, a plurality of arm plates arranged in mutually spaced relationship between said rotor rim and said rotor hub, and annular end plate members arranged transversely with respect to said rotor shaft between said rotor rim and said rotor shaft;
   a plurality of inlet chambers being defined between said end plate members and said arm plates, at least one of said end plate members having inlet openings for the supply of cooling gas flow to said inlet chambers;
   means for conducting cooling gas from said inlet chambers to a space between said rotor and said stator, said means for conducting cooling gas comprising first non-rotating shield means at both ends of the machine secured to said stator core for axially confining the radially outwardly directed cooling gas flow within said space for ensuring a flow of cooling gas through said stator core passageways;
   means for making sealing contact between said first non-rotating shield means and said rotor;
   a second non-rotating shield means provided at least at one end of the machine;
   a gas space for admission of cooling gas flowing towards said inlet chambers, said gas space being at least partly defined by said second non-rotating shield means and an end plate member;
   at least one opening for admission of cooling gas into said gas space; and,
   a plurality of guide vanes disposed in said opening, said guide vanes being arranged to deflect the flow of cooling gas into said gas space in the direction of rotation of said rotor.

2. A synchronous machine according to claim 1 in which said rotor shaft is substantially vertical.

3. A synchronous machine according to claim 1 comprising means for sealing between said rotor shaft and said second non-rotating shield means.

4. A synchronous machine according to claim 1 in which said second non-rotating shield means adjoins said first shield means.

5. A synchronous machine according to claim 1 wherein at least some of said guide vanes are rotatable around a turning axis for adjusting their angular position.

* * * * *